Figure 1:
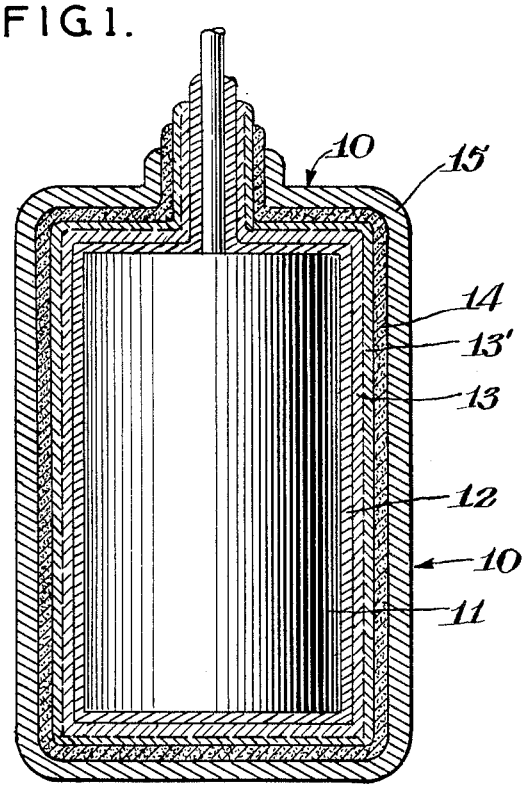

March 23, 1965   R. J. MILLARD   3,174,209
PROCESS FOR PRODUCING SOLID ELECTROLYTE CAPACITOR
Filed Jan. 3, 1961

INVENTOR:
Richard J. Millard

BY Connolly and Hutz
ATTORNEYS

United States Patent Office 3,174,209
Patented Mar. 23, 1965

3,174,209
PROCESS FOR PRODUCING SOLID
ELECTROLYTE CAPACITOR
Richard J. Millard, Williamstown, Mass., assignor to Sprague Electric Company, North Adams, Mass., a corporation of Massachusetts
Filed Jan. 3, 1961, Ser. No. 79,984
1 Claim. (Cl. 29—25.31)

This invention relates to a process of producing electrolytic capacitors and more particularly to the production of electrolytic capacitors having a solid electrolyte contained in a porous body.

An electrolytic capacitor having a solid electrolyte may be produced by preparing a coherent body of sintered particles of tantalum, suitably forming the dielectric oxide of tantalum on the surfaces of said sintered body and then producing manganese dioxide interspersed within the body and in contact with the dielectric oxide. It has been found that this conductive material may be produced by decomposition from a liquid manganous solution impregnated into the body and then converted to a solid manganese dioxide.

A porous body of sintered tantalum particles formed with a dielectric film of tantalum oxide covering the useful capacitor is formed upon the impregnation of a manganous salt in liquid form into the interstices of the body and subsequently converting the manganous salt to manganese dioxide by pyrolytic decomposition. It has been found that the most satisfactory interpositioning of the manganese dioxide into and on the porous body requires a succession of impregnations and decompositions resulting in a final product having the manganese dioxide completely filling the spaces between the particles and also disposed on the outside of the body so as to form an overlying coat.

The capacitor is completed by applying a cathode layer over the manganese dioxide and then if desired suitably encasing the entire unit. Before the application of the cathode electrode it is desirable to remove some of the excess manganese dioxide from the outer coat before applying the cathode. It has been found that the most desirable manganese dioxide formed by the pyrolytic decomposition for filling the interstices of the porous body has certain undesirable features when disposed on the outside of the body as the outer coat. It is also desired to produce an outer coat of manganese dioxide which is receptive to the application of a cathode in the completion of the capacitor.

It is, therefore, an object of this invention to provide a method of forming manganese dioxide having the most effective properties as a solid electrolyte in a tantalum capacitor.

It is another object of this invention to produce an electrolytic capacitor having manganese dioxide disposed within a porous anode to form a good conductive layer between the dielectric film on the anode body and the cathode of the capacitor.

A still further object of this invention is to provide an electrolytic capacitor with a solid electrolyte of manganese dioxide receptive to the application of a cathode.

In accordance with this invention a novel process has been provided which in a series of steps produces a manganese dioxide conductive layer on and in a porous tantalum anode. This manganese dioxide conductive layer is interpositioned within the porous anode body and is also disposed around the body as an outer layer. The portion of the manganese dioxide is of low resistance and the portion in the outer layer is soft so as to be easily prepared for the reception of the cathode coat.

In general, the novel process for the production of sintered tantalum pellet electrolytic capacitors having a solid electrolyte involves the in situ conversion of a manganese salt disposed within the crevices of a formed tantalum pellet by firing at a temperature of from about 300° to about 450° C., substantially filling the pores of said tantalum pellet contiguous with said oxide coating, said manganese dioxide resulting from a plurality of in situ thermal conversions of a manganous salt by firing at a temperature of from about 300° C. to about 450° C., said oxide coating being obtained by a plurality of electrolytic oxidations of said tantalum pellet, and finally having a peripheral metal cathode coating disposed about said manganese dioxide electrolyte on a granular carbon layer contiguous with said electrolyte and said cathode coating.

In general, this invention provides a superior solid electrolyte anode body having a soft outer coat of solid electrolyte. In this method the porous anode body is repeatedly subjected to impregnation with a decomposable manganous salt, decomposition of the manganous salt to manganese dioxide, removal of excess of manganese dioxide on the exterior of the anode body, reformation of dielectric film on the surface of the sintered particles of the body. Then finally the impregnated body is dipped in the decomposable manganous salt. This final coat of manganous salt is decomposed at a temperature below 300° C. to produce a soft outer coat. The soft outer coat is gently removed. This is followed by a final reformation of the dielectric film.

Referring to the sintered body from which the anode of this invention is produced a sintered pellet is made up from tantalum particles pressing into a coherent pellet and vacuum sintered to yield a porous body. A lead wire is welded to the pellet and the pellet is electrolyzed in an electrolytic bath to form a dielectric oxide on the surfaces of the sintered particles. The pores of the formed anode pellet are impregnated with a solution of decomposable manganous salt. After suitable impregnation with the manganous salt the impregnated pellet is placed in an oven containing in and on the surfaces of its particles the impregnating composition. The impregnated pellet is then subjected to a heat which decomposes the manganous salt to manganese dioxide. After the conversion of the salt the pellet is subjected to further steps of electrolytic formation impregnation with the manganous salt and decomposition to the semiconductive material.

To prepare a solid state electrolytic device in acocrdance with this invention the tantalum pellet useful as the anode is about 35 to 45% porosity. The porosity is determined by dividing the weight of the pellet by the product of the density of the metal by the volume of the pellet. This pellet consisting of compressed and sintered tantalum powder having a particle size distribution of between 0.2 and 35 microns, is subjected to formation by disposition in an electrolyte and subsequent imposition of a current flow. A suitable formation electrolyte is a solution of ammonium chloride in water. The pellet is formed for a suitable period at a suitable current density. After the current has dropped down in an acceptable value, the formed pellets are removed from the electrolyte and the formation electrolyte is removed as by thermal purging. Other suitable formation elecrolyte comparable to the ammonium chloride include oxalic acid.

Thereafter the tantalum pellet is vacuum impregnated with a 50% manganous nitrate solution (specific gravity of about 1.5) at room temperature after which the vacuum is broken and the units allowed to stand in the solution for a period of 10 minutes.

According to the improved process of this invention the impregnated pellet is heated in a kiln to a temperature of around 400° C. within a period of less than one and one-half minutes. The impregnated pellet is then maintained at this temperature for a period of at least three minutes at the end of which time generation of nitrous oxide is substantially complete. The heat continues until the removal of the nitrous oxide from the pellet is complete and up to at least 6 minutes from the initial heating.

The decomposition is followed by a reformation followed by the sequential steps of reimpregnation with the manganous salt, firing the manganous salt of manganese dioxide and then further repetition of the process to build up the manganese dioxide gradually.

In the final step the decomposable manganous salt is applied by dipping the pellet in the solution. The dipped pellet is heated only to a temperature of between 225° and 300° C. In this last step the manganese dioxide formed on the exterior is soft. Any excess or irregularity in the soft outer layer of manganese dioxide is removed from the pellet by brushing the pellet to provide a finished anode body. It is thus readily prepared for the reception of the cathode layer.

After the final decomposition step and the removal of the excess manganese dioxide, the final anodization takes place. After this, the final formation electrolyte is removed and the solid electrolyte is coated with a thin film of graphite. A metal electrode is then applied over the graphite by suitable known means.

Figure 2:
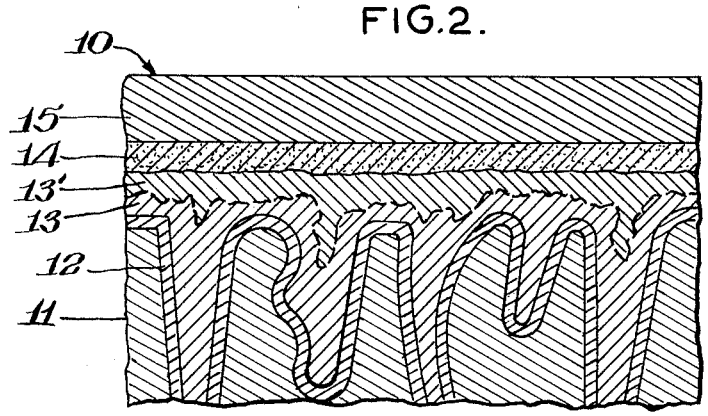

A further illustration of the above-described embodiment is provided by the accompanying drawing and detailed description of the figures wherein:

FIGURE 1 represents a vertical sectional view of an improved capacitor produced by the novel process, and FIGURE 2 is a diagrammatic representation of an enlarged cross section of a portion of the capacitor illustrated in FIGURE 1 showing its relative parts in greater detail.

Referring to the figures, a capacitor 10 produced by the novel process of this invention is illustrated in FIGURE 1. The capacitor 10 has a porous anode body 11 on which is formed a dielectric film 12. Solid manganese dioxide which is the product of decomposing a manganese salt to the manganese dioxide is shown in two coats. An inner coat 13 is the product of decomposition at a temperature of from around 400° C. up to 430° C. A soft outer coat 13' is the product of decomposition of the manganese salt to manganese dioxide at a temperature of from around 225° to around 300° C. A thin film 14 of graphite is deposited over the outer layer 13'. A metal electrode 15 overlies substantially all of the graphite film 14.

The above description and accompanying figures of the drawing merely illustrate this invention. It will be understood however that modifications are possible and that it is intended that the scope be limited only by the appended claim.

What is claimed is:

In the method of manufacturing solid electrolyte capacitors with an effective counterelectrode by compressing tantalum particles into a porous electrode, electrolytically anodizing a substantially impervious dielectric film upon the exposed portions of each of said particles and successively impregnating said body with a manganese salt convertible to a solid manganese dioxide, and reforming the dielectric film by electrolyte reanodizing, the steps of initially impregnating said body with said manganese salt and firing said manganese salt at a temperature of from around 400° C. up to 430° C. for a period of at least 3 minutes to convert said manganese salt to a hard manganese dioxide, subsequently reforming the dielectric film by further electrolytically anodizing said body, then repeating said impregnation and conversion of manganese salt to a hard manganese dioxide by firing at a temperature of from around 400° C. up to 430° C., and preparing the outer layer of said manganese dioxide for the effective reception of a cathode coat by converting a final layer of manganese salt to manganese dioxide at a temperature of from about 225° to around 300° C. and recovering thereby a soft outer layer of manganese dioxide, and finally applying a conductive cathode coat on said soft outer layer.

References Cited in the file of this patent

UNITED STATES PATENTS

| | | |
|---|---|---|
| 1,510,173 | Hosenfeld | Sept. 30, 1924 |
| 1,906,691 | Lilienfeld | May 2, 1933 |
| 2,005,279 | Van Geel | June 18, 1935 |
| 2,936,514 | Millard | May 17, 1960 |
| 3,004,332 | Werner | Oct. 17, 1961 |

FOREIGN PATENTS

| | | |
|---|---|---|
| 747,051 | Great Britain | Mar. 28, 1956 |